United States Patent
Kim

(10) Patent No.: US 9,630,609 B2
(45) Date of Patent: Apr. 25, 2017

(54) METHOD OF DETECTING SOLENOID VALVE FAILURE OF VEHICLE ELECTRIC BRAKE BOOSTER AND FAILURE DETECTING APPARATUS FOR IMPLEMENTING THE SAME

(71) Applicant: HYUNDAI MOBIS CO., LTD., Seoul (KR)

(72) Inventor: Do Kun Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 310 days.

(21) Appl. No.: 14/215,230

(22) Filed: Mar. 17, 2014

(65) Prior Publication Data

US 2014/0316642 A1  Oct. 23, 2014

(30) Foreign Application Priority Data

Apr. 19, 2013 (KR) .................. 10-2013-0043439

(51) Int. Cl.
| | |
|---|---|
| *B60T 17/22* | (2006.01) |
| *B60T 7/04* | (2006.01) |
| *B60T 13/66* | (2006.01) |
| *B60T 13/74* | (2006.01) |
| *B60T 8/88* | (2006.01) |

(52) U.S. Cl.
CPC .......... *B60T 17/221* (2013.01); *B60T 7/042* (2013.01); *B60T 8/885* (2013.01); *B60T 13/662* (2013.01); *B60T 13/745* (2013.01)

(58) Field of Classification Search
CPC ........ B60T 13/00; B60T 17/22; B60T 17/221; B60T 17/222; B60T 17/223
See application file for complete search history.

(56) References Cited

U.S. PATENT DOCUMENTS 6,450,591 B1 * 9/2002 Kawahata ............. B60T 8/3655
                                                303/122.05
8,718,893 B1 * 5/2014 Kim ..................... B60T 8/4077
                                                477/182
(Continued)

FOREIGN PATENT DOCUMENTS

CN        102785643 A       11/2012

OTHER PUBLICATIONS

Chinese Office Action issued on Aug. 24, 2016, in counterpart Chinese Application No. 201410091817.4 (12 pages, in Chinese).

*Primary Examiner* — Redhwan k Mawari
*Assistant Examiner* — Michael Whalen
(74) *Attorney, Agent, or Firm* — NSIP Law

(57) ABSTRACT

The present invention provides a method of detecting solenoid valve failure of a vehicle electric brake booster, the method including: a) driving the motor so that the piston moves forward until the piston closes at least the cut-off hole in a state in which the solenoid valve is locked; b) measuring pressure in the master cylinder in a state in which the piston is moved forward; c) determining whether the pressure in the master cylinder which is measured in step b) exceeds a predetermined reference value; and d) determining that the solenoid valve is in a failure state when the pressure in the master cylinder which is measured in step b) is the predetermined reference value or less, to detect failure of the solenoid valve only by a software control change, thereby providing an advantageous effect that secures braking safety.

8 Claims, 4 Drawing Sheets

(56) References Cited

U.S. PATENT DOCUMENTS

| | | | |
|---|---|---|---|
| 2001/0038243 A1* | 11/2001 | Isono | B60K 6/365 303/116.1 |
| 2006/0113836 A1* | 6/2006 | Nakamura | B60T 8/36 303/122.04 |
| 2013/0127240 A1* | 5/2013 | Noro | B60T 13/58 303/14 |
| 2013/0249274 A1* | 9/2013 | Miyazaki | B60T 7/042 303/6.01 |
| 2015/0019096 A1* | 1/2015 | Kim | B60T 7/042 701/70 |
| 2015/0175144 A1* | 6/2015 | Watanabe | B60T 8/92 303/10 |
| 2015/0197228 A1* | 7/2015 | Isono | B60T 11/224 92/61 |
| 2015/0314765 A1* | 11/2015 | Maruo | B60T 8/4081 303/10 |

\* cited by examiner

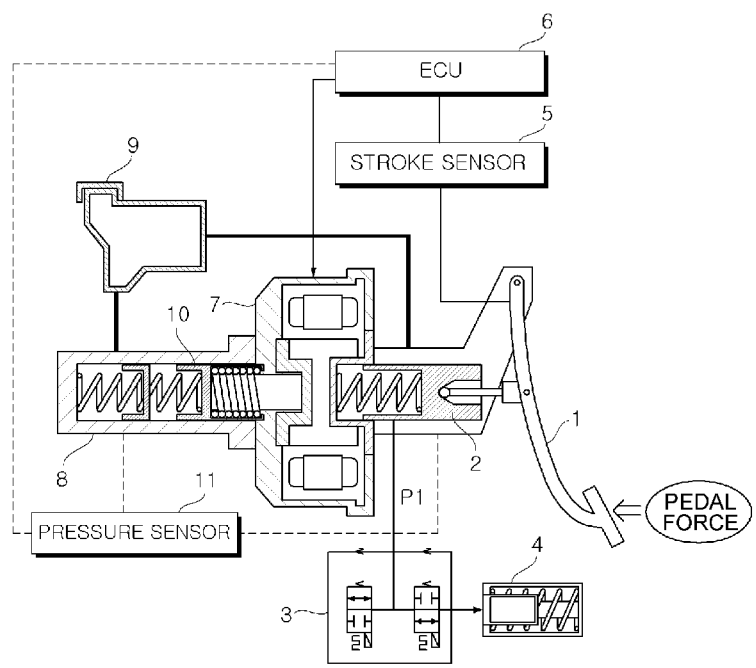
FIG. 1
Conventional

METHOD OF DETECTING SOLENOID VALVE FAILURE OF VEHICLE ELECTRIC BRAKE BOOSTER AND FAILURE DETECTING APPARATUS FOR IMPLEMENTING THE SAME

CROSS-REFERENCE TO RELATED APPLICATIONS

This application claims priority to and the benefit of Korean Patent Application No. 10-2013-0043439 filed in the Korean Intellectual Property Office on Apr. 19, 2013, the entire contents of which are incorporated herein by reference.

TECHNICAL FIELD

The present invention relates to a method of detecting solenoid valve failure of a vehicle electric brake booster and a failure detecting apparatus for implementing the same, and more particularly, to a method of detecting solenoid valve failure of a vehicle electric brake booster and an apparatus for detecting failure and implementing the same which detect failure of an electric powered brake booster.

BACKGROUND ART

A booster refers to a device that boosts pedal force by a driver which is transmitted from a brake pedal to a master cylinder. An electric booster refers to a device that interprets pedal force by a driver as an electrical signal and drives a motor based on the interpreted electrical signal, thereby producing braking pressure by pressing the master cylinder. As electric vehicles and hybrid vehicles universally come into use, recently, the electric booster attracts the attention as a device that is substituted for a hydraulic booster.

A process of producing braking pressure using the electric booster will be briefly introduced with reference to FIG. 1.

FIG. 1 is a view illustrating a braking system including a typical electric booster.

Referring to FIG. 1, when a driver steps on a pedal 1, pedal force of the driver is transmitted to a sub master cylinder 2. A solenoid valve 3, which is connected to the sub master cylinder 2, forms a hydraulic line P1 from the sub master cylinder 2 to a pedal simulator 4. The pedal simulator 4 provides reaction force to the pedal 1 so as to allow the driver to feel the pedal force. An oil reservoir 9 is connected to a master cylinder 8.

Meanwhile, a stroke sensor 5 is mounted to the pedal 1 so as to sense a stroke using a rotation angle of the pedal 1. An ECU 6 recognizes required braking force of the driver based on the sensed stroke, drives a motor 7 based on the braking force, and moves a piston 10 forward in conjunction with the motor 7, thereby producing braking pressure by pressing the master cylinder 8. In this case, the ECU 6 properly feedback controls the braking pressure using pressure sensors 11 which are installed in the sub master cylinder 2 and the master cylinder 8.

In the case of the electric booster, highly reliable operations of the motor and the solenoid valve are very important factors. In a case in which the solenoid valve is not normally operated due to mechanical and electrical defects, a fatal problem about braking safety may occur.

SUMMARY OF THE INVENTION

The present invention has been made in an effort to provide an apparatus for detecting solenoid valve failure of a vehicle electric brake booster and a method of controlling the same which detect failure of a solenoid valve so as to secure braking stability.

An exemplary embodiment of the present invention provides a method of detecting solenoid valve failure of a vehicle electric brake booster which includes a master cylinder which has a cut-off hole that communicates with the outside and includes a piston in the master cylinder which moves forward or retreats by a motor, and a solenoid valve which is connected to the master cylinder and a sub master cylinder, the method including: a) driving the motor so that the piston moves forward until the piston closes at least the cut-off hole in a state in which the solenoid valve is locked; b) measuring pressure in the master cylinder in a state in which the piston is moved forward; c) determining whether the pressure in the master cylinder which is measured in step b) exceeds a predetermined reference value; and d) determining that the solenoid valve is in a failure state when the pressure in the master cylinder which is measured in step b) is the predetermined reference value or less.

The method may further include: e) driving the motor so that the piston retreats until the piston comes into contact with a stopper installed in the master cylinder in a state in which the solenoid valve is locked when the pressure in the master cylinder which is measured in step b) exceeds the predetermined reference value; f) measuring pressure in the master cylinder in a state in which the piston retreats; g) determining whether the pressure in the master cylinder which is measured in step f) is 0 or less; and h) determining that the solenoid valve is in a failure state when the pressure in the master cylinder which is measured in step f) exceeds 0.

The method may further include i) driving the motor so that the piston moves to a zero point position in a state in which the solenoid valve is opened when the pressure in the master cylinder which is measured in step f) is 0 or less; j) measuring pressure in the master cylinder and pressure in the sub master cylinder in a state in which the piston is moved to the zero point position; k) determining whether the pressure in the master cylinder and the pressure in the sub master cylinder which are measured in step j) are 0 or less; and l) determining that the solenoid valve is in a failure state when at least any one of the pressure in the master cylinder and the pressure in the sub master cylinder which are measured in step j) exceeds 0.

The method may further include warning a driver when it is determined that the solenoid valve is in a failure state.

Another exemplary embodiment of the present invention provides an apparatus of detecting solenoid valve failure of a vehicle electric brake booster which includes a master cylinder which has a cut-off hole that communicates with the outside and includes a piston in the master cylinder which moves forward or retreats by a motor, and a solenoid valve which is connected to the master cylinder and a sub master cylinder, the apparatus including: a control unit which locks the solenoid valve, and drives the motor so that the piston moves forward until the piston closes at least the cut-off hole; a pressure measuring unit which measures pressure in the master cylinder in a state in which the piston is moved forward; and a solenoid valve failure determining unit which determines that the solenoid valve is in a failure state when the pressure in the master cylinder which is measured by the pressure measuring unit is a predetermined reference value or less.

When the pressure in the master cylinder which is measured by the pressure measuring unit exceeds the predetermined reference value, the control unit may drive the motor so that the piston retreats until the piston comes into contact with a stopper installed in the master cylinder in a state in which the solenoid valve is locked, the pressure measuring unit may measure pressure in the master cylinder in a state in which the piston retreats, and the solenoid valve failure determining unit may determine that the solenoid valve is in a failure state when the measured pressure in the master cylinder exceeds 0.

When the pressure in the master cylinder which is measured by the pressure measuring unit is 0 or less, the control unit may open the solenoid valve, and drive the motor so that the piston is moved to a zero point position, the pressure measuring unit may measure pressure in the master cylinder and pressure in the sub master cylinder in a state in which the piston is moved to the zero point position, and when at least any one of the measured pressure in the master cylinder and the measured pressure in the sub master cylinder exceeds 0, the solenoid valve failure determining unit may determine that the solenoid valve is in a failure state.

The apparatus may further include a warning unit which warns a driver when it is determined that the solenoid valve is in a failure state.

According to the method of detecting solenoid valve failure of the vehicle electric brake booster according to the present invention, the method is configured to detect failure of the solenoid valve only by a software control change in a state in which braking pressure is generated, in a state in which braking pressure is not generated, and in a control standby state, thereby providing an advantageous effect that secures braking safety.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a view illustrating a braking system including a typical electric booster.

Figure 2:
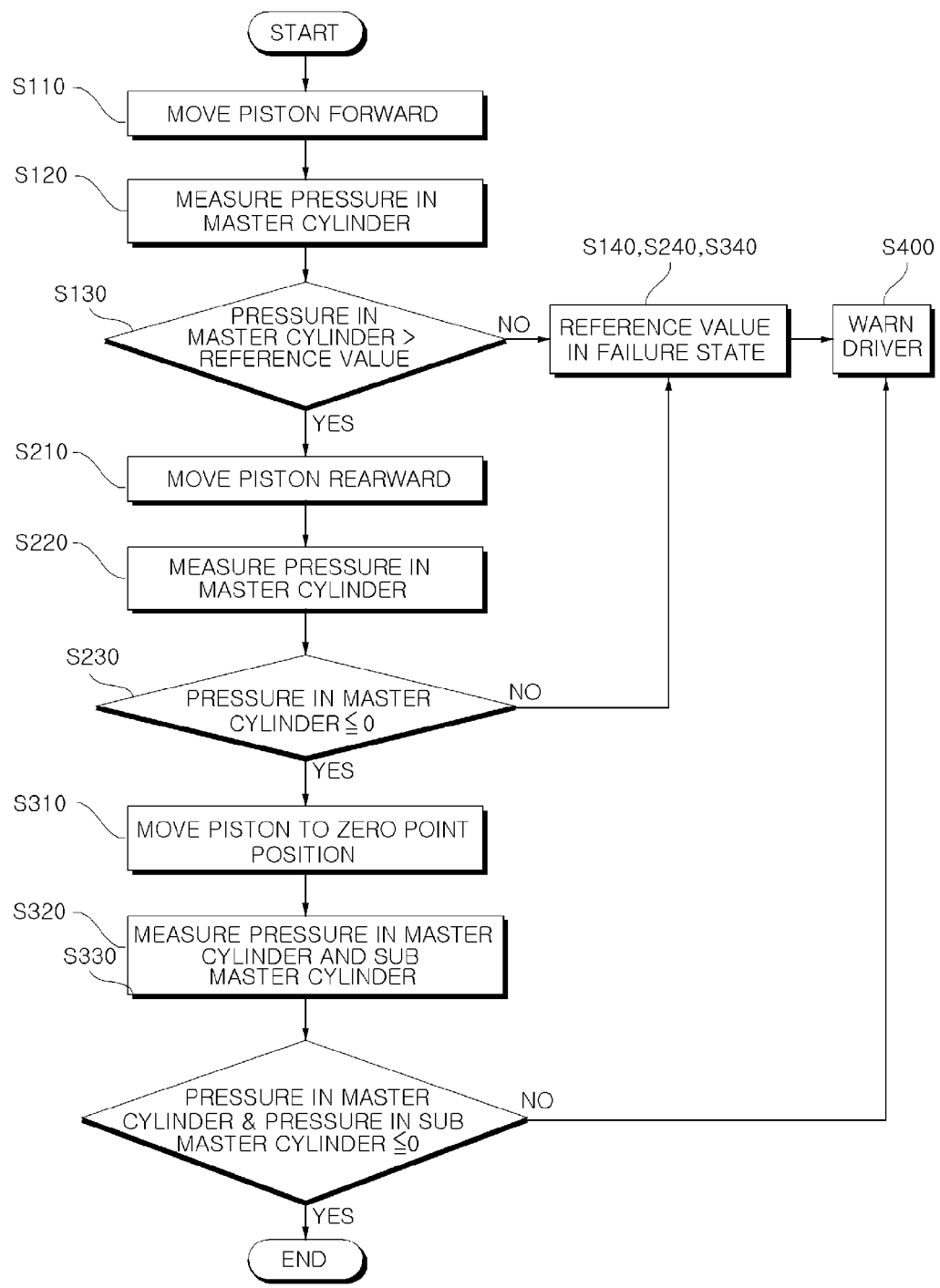
FIG. 2 is a flow chart illustrating a method of detecting solenoid valve failure of a vehicle electric brake booster according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments according to the present invention will be described in detail with reference to the accompanying drawings. First, in denoting reference numerals to constituent elements of respective drawings, it should be noted that the same elements will be designated by the same reference numerals although they are shown in different drawings. Hereinafter, preferred embodiments of the present invention will be described, but, of course, the technical spirit of the present invention is not restricted or limited thereto, but the preferred embodiments of the present invention may be modified by a person with ordinary skill in the art to be variously performed.

The present invention has a technical feature that measures pressure in a master cylinder and a sub master cylinder so as to detect whether a solenoid valve is normally operated in a state in which braking pressure is generated, in a state in which braking pressure is not generated, and in a control standby state.

Figure 3:
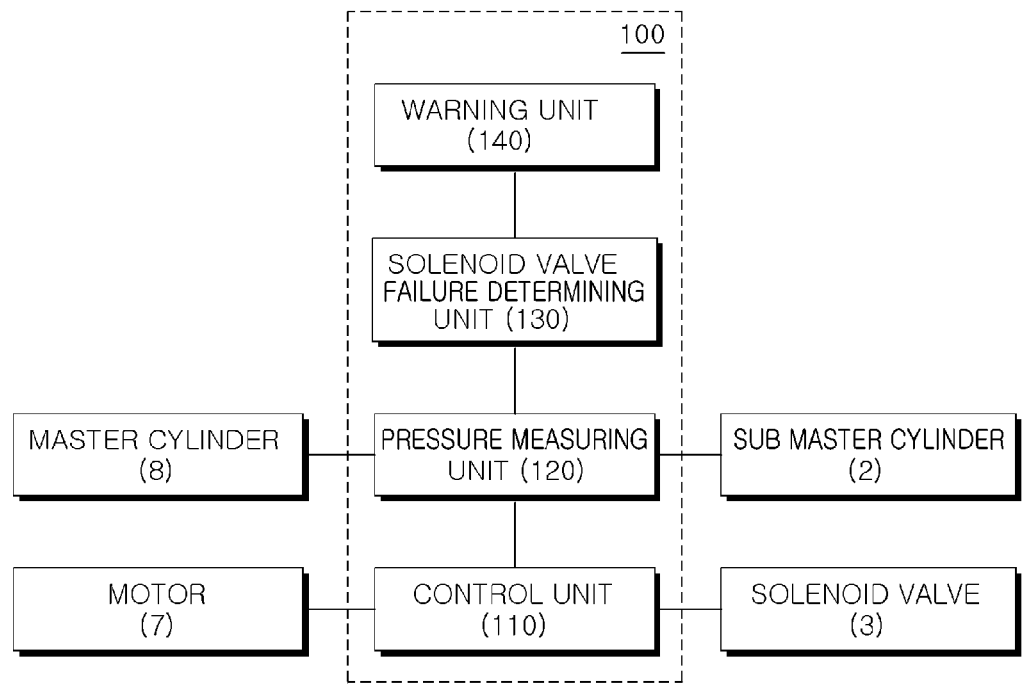
FIG. 3 is a block diagram illustrating an apparatus for detecting solenoid valve failure of a vehicle brake booster according to an exemplary embodiment of the present invention.

FIG. 2 is a flow chart illustrating a method of detecting solenoid valve failure of a vehicle electric brake booster according to an exemplary embodiment of the present invention, and FIG. 3 is a block diagram illustrating an apparatus for detecting solenoid valve failure of a vehicle brake booster according to an exemplary embodiment of the present invention.

Referring to FIGS. 2 and 3 together, an apparatus 100 for detecting solenoid valve failure of a vehicle brake booster according to an exemplary embodiment of the present invention may include a control unit 110, a pressure measuring unit 120, a solenoid valve failure determining unit 130, and a warning unit 140.

Hereinafter, a method of detecting solenoid valve failure which is performed using the apparatus 100 for detecting failure will be described.

Figure 4:
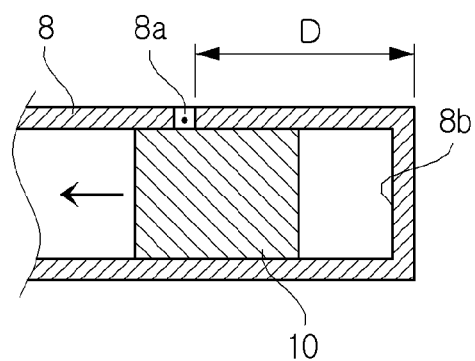
FIG. 4 is a view illustrating motion of a piston which moves forward so as to close a cut-off hole and produces braking pressure.

First, the control unit 110 applies an electric current to a solenoid valve 3 so as to lock the solenoid valve 3 (NO valve). The control unit 110 drives a motor 7 until a piston 10 closes a cut-off hole 8a as illustrated in FIG. 4 (S110).

The cut-off hole 8a is a hole that is formed in a master cylinder 8, and allows the interior and the exterior of the master cylinder 8 to communicate with each other. In a case in which the cut-off hole 8a is opened when viewed from the exterior of the master cylinder 8, the interior of the master cylinder 8 is in an atmospheric pressure state. When the piston 10 moves forward in a state in which the cut-off hole 8a is closed by the piston 10, predetermined braking pressure is generated in the master cylinder 8.

A length at which the piston 10 moves forward may be about twice as much as the distance D from a stopper 8b to the cut-off hole 8a of the master cylinder 8, but the present invention is not limited thereto, and the length may be properly changed so that a certain amount of braking pressure, which may be compared with a predetermined reference value, is generated.

Next, the pressure measuring unit 120 measures pressure in the master cylinder 8 in a state in which the piston 10 is moved forward (S120). The pressure measuring unit 120 may be a pressure sensor that is installed in the master cylinder 8.

Next, the solenoid valve failure determining unit 130 compares the pressure in the master cylinder 8 which is measured by the pressure measuring unit 120 with a predetermined reference value (S130), and determines failure of the solenoid valve 3 when the measured pressure is smaller than the reference value (S140). The state in which the measured pressure in the master cylinder 8 is smaller than the reference value means that the solenoid valve 3 is not normally operated such that the solenoid valve 3 is not locked, or there is a problem with the locked state.

Figure 5:
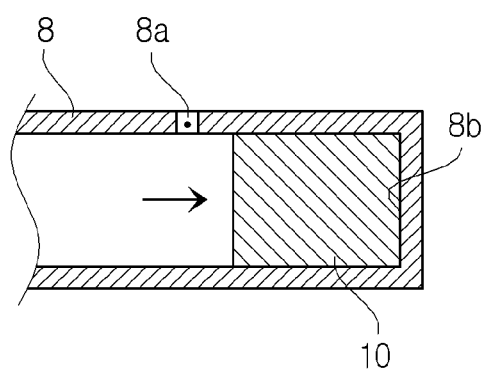
FIG. 5 is a view illustrating motion of the piston which retreats until the piston comes into contact with a stopper.

Meanwhile, when the measured pressure in the master cylinder 8 which is measured by the pressure measuring unit 120 is greater than the predetermined reference value, the control unit 110 drives the motor 7 so that the piston 10 retreats until the piston 10 comes into contact with the stopper 8b of the master cylinder 8 as illustrated in FIG. 5 (S210).

Next, the pressure measuring unit 120 measures pressure in the master cylinder 8 in a state in which the piston 10 retreats (S220).

Next, the solenoid valve failure determining unit 130 determines whether the measured pressure in the master cylinder 8 which is measured by the pressure measuring unit 120 exceeds 0 (S230), and determines failure of the solenoid valve 3 when the measured pressure exceeds 0 (S240). This means that the solenoid valve 3 is not normally operated such that the solenoid valve 3 is not locked, or there is a problem with the locked state, even in a case in which residual pressure is generated in the master cylinder 8 in a state in which the solenoid valve 3 is in the locked state and the cut-off hole 8a is in the opened state.

Figure 6:
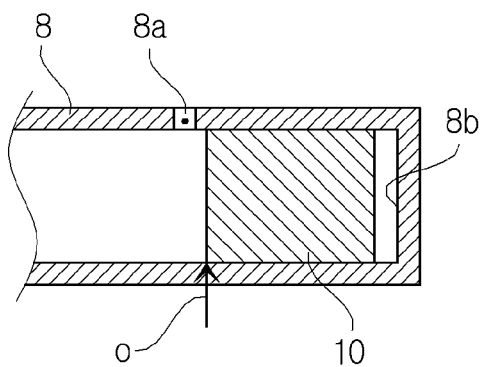
FIG. 6 is a view illustrating motion of the piston which moves to a zero point position.

Meanwhile, when the measured pressure in the master cylinder 8 which is measured by the pressure measuring unit 120 is 0 or less, the control unit 110 cuts off the electric current, which is applied to the solenoid valve 3, so as to open the solenoid valve 3 as illustrated in FIG. 6 (NO valve). The control unit 110 drives the motor 7 so that the piston 10 moves forward until the piston 10 reaches a zero point position o (S310). Here, the zero point position o means a front end position of the piston 10 in the control standby state.

Next, the pressure measuring unit 120 measures pressure in the master cylinder 8 and a sub master cylinder 2 in a state in which the piston 10 is moved to the zero point position o (S320).

Next, when any one of the pressure in the master cylinder 8 and the pressure in the sub master cylinder 2, which are measured by the pressure measuring unit 120, exceeds 0, the solenoid valve failure determining unit 130 determines failure of the solenoid valve 3 (S340). In a case in which it is measured that residual pressure remains in the master cylinder 8 or the sub master cylinder 2 in the control standby state in which the cut-off hole 8a is opened, this means that the solenoid valve 3 is locked, or is not normally opened.

When both the measured pressure in the master cylinder 8 and the measured pressure in the sub master cylinder 2 are 0 or less, it is determined that the solenoid valve 3 is normal, and the state becomes the control standby state.

Next, when the solenoid valve failure determining unit 130 determines that the solenoid valve 3 fails, the warning unit 140 may warn a driver of the failure (S400).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of detecting solenoid valve failure of a vehicle electric brake booster, the method comprising:
    driving, via a motor, and in response to a solenoid valve connected to the master cylinder being locked, a piston in the master cylinder away from a base position near the motor until the piston reaches a forward position away from the motor, thereby closing at least a cut-off hole in a wall of the master cylinder that allows fluid pressure exchange between an inside of the cylinder and an outside of the cylinder;
    measuring, using a pressure sensor installed at a piston chamber of the master cylinder, a first pressure in the piston chamber of the master cylinder in response to the piston being in the forward position;
    determining whether the first pressure exceeds a predetermined reference value; and
    determining that the solenoid valve is in a failure state in response to the first pressure being less than or equal to the predetermined reference value.

2. The method of claim 1, further comprising:
    driving, via the motor, the piston backward until the piston reaches a backward position, thereby coming into contact with a stopper installed in the master cylinder, in response to the solenoid valve being locked and in response to the first pressure exceeding the predetermined reference value;
    measuring a second fluid pressure in the master cylinder in response to the piston being in the backward position;
    determining whether the second pressure is less than or equal to atmospheric pressure; and
    determining that the solenoid valve is in a failure state in response to the second pressure being greater than atmospheric pressure.

3. The method of claim 2, further comprising:
    driving, via the motor, the piston to a zero point position in response to the solenoid valve being opened and in response to the second pressure being less than or equal to atmospheric pressure;
    measuring a third fluid pressure in the master cylinder and a fluid fourth pressure in the sub master cylinder in response to the piston being in the zero point position;
    determining whether the third and fourth pressures are less than or equal to atmospheric pressure; and determining that the solenoid valve is in a failure state in response to either the third or fourth pressure being greater than atmospheric pressure.

4. The method of claim 3, further comprising:
warning a driver in response to determining that the solenoid valve is in a failure state.

5. An apparatus for detecting solenoid valve failure of a vehicle electric brake booster, the apparatus comprising:
a control unit configured to lock a solenoid valve connected to a master cylinder and drive, via a motor, a piston in the master cylinder away from a base position near the motor until the piston reaches a forward position away from the motor, thereby closing at least a cut-off hole in a wall of the master cylinder that allows fluid pressure exchange between an inside of the cylinder and an outside of the cylinder;
a pressure measuring unit comprising a pressure sensor installed at a piston chamber of the master cylinder and configured to measure a first fluid pressure in the piston chamber of the master cylinder in response to the piston being in the forward position; and
a solenoid valve failure determining unit configured to determine that the solenoid valve is in a failure state in response to the first pressure being less than or equal to a predetermined reference value.

6. The apparatus of claim 5, wherein:
the control unit is configured to drive, via the motor, the piston backward until the piston reaches a backward position, thereby coming into contact with a stopper installed in the master cylinder, in response to the solenoid valve being locked and in response to the first pressure exceeding the predetermined reference value;
the pressure measuring unit is configured to measure a second fl id pressure in the master cylinder in response to the piston being in the backward position; and
the solenoid valve failure determining unit is configured to determine that the solenoid valve is in a failure state in response to the second pressure being greater than atmospheric pressure.

7. The apparatus of claim 6, wherein:
the control unit is configured to open the solenoid valve and drive, via the motor, the piston to a zero point position in response to the second pressure being less than or equal to atmospheric pressure;
the pressure measuring unit is configured to measure a third fluid pressure in the master cylinder and a fourth pressure in the sub master cylinder in response to the piston being in the zero point position; and
the solenoid valve failure determining unit is configured to determine that the solenoid valve is in a failure state in response to either the third or fourth pressures being greater than atmospheric pressure.

8. The apparatus of claim 7, further comprising:
a warning unit configured to warn a driver in response to it being determined that the solenoid valve is in a failure state.

* * * * *